United States Patent
Wehbeh et al.

(10) Patent No.: US 10,192,012 B1
(45) Date of Patent: Jan. 29, 2019

(54) PSEUDO-INVERTER CONFIGURATION FOR SIGNAL ELECTROMIGRATION ANALYSIS

(71) Applicant: Cadence Design Systems, Inc., San Jose, CA (US)

(72) Inventors: Jalal Wehbeh, Sunnyvale, CA (US); Aswin Ramakrishnan, El Cerrito, CA (US); Igor Keller, Pleasanton, CA (US); Federico Politi, Menlo Park, CA (US); Ajish Thomas, San Jose, CA (US)

(*) Notice: Subject to any disclaimer, the term of this patent is extended or adjusted under 35 U.S.C. 154(b) by 44 days.

(21) Appl. No.: 15/470,722

(22) Filed: Mar. 27, 2017

(51) Int. Cl.
    *G06F 17/50*    (2006.01)

(52) U.S. Cl.
    CPC ...... *G06F 17/5022* (2013.01); *G06F 17/5036* (2013.01); *G06F 17/5045* (2013.01); *G06F 17/5081* (2013.01); *G06F 2217/76* (2013.01)

(58) Field of Classification Search
    CPC .................................................. G06F 17/5036
    USPC .......................................................... 716/115
    See application file for complete search history.

(56) References Cited

U.S. PATENT DOCUMENTS

| 9,043,771 | B1 | 5/2015 | Vardhan et al. |
| 9,135,269 | B2 | 9/2015 | Shetty et al. |
| 2009/0013290 | A1* | 1/2009 | Keinert ............... G06F 17/5036 716/136 |
| 2012/0123745 | A1* | 5/2012 | Sheu ................... G06F 17/5036 703/2 |
| 2013/0060657 | A1 | 3/2013 | Kudva et al. |

* cited by examiner

*Primary Examiner* — Suchin Parihar
(74) *Attorney, Agent, or Firm* — McDermott Will & Emery LLP

(57) ABSTRACT

A method for determining a signal electromigration effect in a circuit includes obtaining a partition netlist from a partition of an integrated circuit netlist and identifying a complementary netlist that couples a second input with the output is provided. The complementary netlist is logically independent from the reference netlist. The method includes modifying the partition netlist to couple the reference netlist and the complementary netlist in an inverting configuration, and providing an electromagnetic pulse to at least one of the first input or the second input to induce a current through one of the plurality of circuit components. The method also includes determining an electromigration effect from the current on the one of the plurality of circuit components.

20 Claims, 9 Drawing Sheets

PSEUDO-INVERTER CONFIGURATION FOR SIGNAL ELECTROMIGRATION ANALYSIS

TECHNICAL FIELD

Embodiments described herein are generally related to the field of circuit simulation in circuit modeling and fabrication. More specifically, embodiments described herein are related to partitioning a large circuit model for efficient circuit simulation using a pseudo-inverse configuration of an integrated circuit model.

BACKGROUND

Signal electromigration (SEM) is a phenomenon that causes wires and other circuit elements to deteriorate with usage as current flows through them. Current circuit models include large numbers of components arranged in ever-smaller dimensions, requiring small wires and resistors to withstand large current densities, thereby enhancing the deleterious effects of SEM. Given the possible large sizes of simulations and simulation tasks for complex circuits including billions of components in a single chip, integrated circuit models simplify the assumptions of signal flow in a circuit, thereby generally overestimating SEM effects. This results in modeling decisions such as reducing component density and the like, which ultimately reduces the cost efficiency of circuit fabrication. Furthermore, oversimplification may result in overlooking certain signal combinations that may occur during circuit operation, which may result in catastrophic circuit failure, forcing a complete re-design of a circuit. Such an outcome is highly undesirable, if only because of the large cost of retooling manufacturing protocols at the foundry level as well as the missed market window opportunity cost.

The description provided in the background section should not be assumed to be prior art merely because it is mentioned in or associated with the background section. The background section may include information that describes one or more aspects of the subject technology.

SUMMARY

In a first embodiment, a computer-implemented method for determining a signal electromigration effect in a circuit is described. The computer-implemented method includes obtaining a partition netlist from a partition of an integrated circuit netlist, the partition netlist including an identification of a plurality of circuit components, and identifying a reference netlist that couples a first input of the partition netlist with an output of the partition netlist. The computer-implemented method also includes identifying a complementary netlist that couples a second input of the partition netlist with the output of the partition netlist, wherein the complementary netlist is logically independent from the reference netlist, modifying the partition netlist to couple the reference netlist and the complementary netlist in an inverting configuration, and providing an electromagnetic pulse to at least one of the first or the second inputs of the partition netlist to induce a current through one of the plurality of circuit components. The computer-implemented method also includes determining an electromigration effect from the current on the one of the plurality of circuit components.

In a second embodiment, a system is described that includes a memory storing instructions and at least one processor that executes the instructions to perform a method. The method includes steps to obtain a partition netlist from a partition of an integrated circuit netlist, the partition netlist including an identification of a plurality of circuit components and to identify a reference netlist that couples a first input of the partition netlist with an output of the partition netlist. The method also includes steps to identify a complementary netlist that couples a second input of the partition netlist with the output of the partition netlist, wherein the complementary netlist is logically independent from the reference netlist and to modify the partition netlist to couple the reference netlist and the complementary netlist in an inverting configuration. The method also includes steps to provide an electromagnetic pulse to at least one of the first or the second inputs of the partition netlist to induce a current through one of the plurality of circuit components and to determine an electromigration effect from the current on the one of the plurality of circuit components.

In yet another embodiment, a non-transitory, machine-readable storage medium is described that includes machine-readable instructions for causing a processor to execute a method. The method includes obtaining a partition netlist from a partition of an integrated circuit netlist, the partition netlist comprising an identification of a plurality of circuit components and identifying a reference netlist that couples a first input of the partition netlist with an output of the partition netlist. The method also includes identifying a complementary netlist that couples a second input of the partition netlist with the output of the partition netlist, wherein the complementary netlist is logically independent from the reference netlist and modifying the partition netlist to couple the reference netlist and the complementary netlist in an inverting configuration. The method also includes providing an electromagnetic pulse to at least one of the first or the second inputs of the partition netlist to induce a current through one of the plurality of circuit components and determining an electromigration effect from the current on the one of the plurality of circuit components.

In a further embodiment, a system is described that includes a means for storing instructions and a means to execute the instructions to perform steps to obtain a partition netlist from a partition of an integrated circuit netlist, the partition netlist including a description of a plurality of circuit components and to identify a reference netlist that couples a first input of the partition netlist with an output of the partition netlist. The means to execute the instructions also performs steps to identify a complementary netlist that couples a second input of the partition netlist with the output of the partition netlist, wherein the complementary netlist is logically independent from the reference netlist and to modify the partition netlist to couple the reference netlist and the complementary netlist in an inverting configuration. The means to execute the instructions also performs steps to provide an electromagnetic pulse to at least one of the first or the second inputs of the partition netlist to induce a current through one of the plurality of circuit components and to determine an electromigration effect from the current on the one of the plurality of circuit components.

BRIEF DESCRIPTION OF THE DRAWINGS

The accompanying drawings, which are included to provide further understanding and are incorporated in and constitute a part of this specification, illustrate disclosed embodiments and together with the description serve to explain the principles of the disclosed embodiments. In the drawings.

Figure 1:
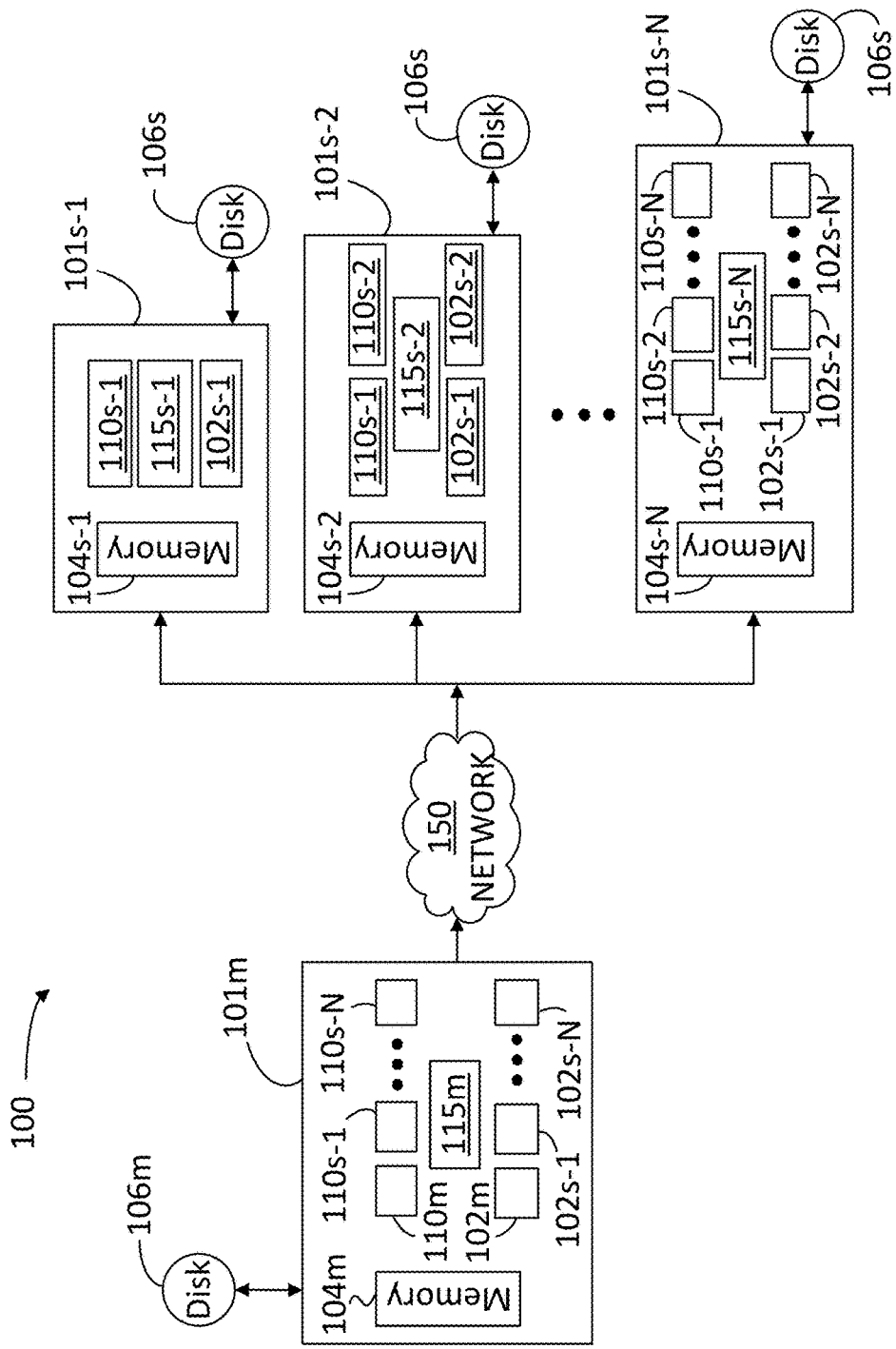
FIG. 1 is a block diagram of a cloud computing environment for integrated circuit (IC) modeling and characterization, according to some embodiments.

In the figures, elements and steps denoted by the same or similar reference numerals are associated with the same or similar elements and steps, unless indicated otherwise. In one or more implementations, not all of the depicted components in each figure may be required, and one or more implementations may include additional components not shown in a figure. Variations in the arrangement and type of the components may be made without departing from the scope of the subject disclosure. Additional components, different components, or fewer components may be utilized within the scope of the subject disclosure.

DETAILED DESCRIPTION

The detailed description set forth below is intended as a description of various implementations and is not intended to represent the only implementations in which the subject technology may be practiced. As those skilled in the art would realize, the described implementations may be modified in various different ways, all without departing from the scope of the present disclosure. Accordingly, the drawings and descriptions are to be regarded as illustrative in nature and not restrictive.

General Overview

The disclosed system provides a method for partitioning a large circuit model for signal electromigration analysis to provide a computationally efficient and more accurate circuit emulation.

The disclosed system addresses a technical problem tied to computer technology and arising in the realm of computer networks, namely the technical problem of efficient usage of multiple computer processing resources in a cloud computing environment for the purpose of obtaining a detailed integrated circuit modeling. The disclosed system solves this problem by partitioning a large circuit model into multiple, smaller circuit partitions that can be modeled efficiently using limited computational resources distributed in a network. For example, in some embodiments the limited computational resources include multiple servers forming the nodes of a network in a cloud computing environment. The system then re-groups the multiple resulting files from each circuit partition into an emulation file representing SEM effects for the entire circuit. Such an approach reduces the computational burden for each single server in a network node, increases the emulation speed of the large circuit model (e.g., in terms of CPU hour usage), and enables a more refined analysis of the large circuit model. A more refined analysis of an integrated circuit model may enable the identification of "critical paths" where performance is heavily dependent on the specific characteristic of circuit components along the critical path.

Embodiments of methods and systems as disclosed herein include static partitioning schemes having no inputs from the user. Some embodiments further include dynamic partitioning schemes including user inputs (e.g., input vectors, slew rate, frequency, and the like). In embodiments as disclosed herein, an IC model is represented by an IC netlist including circuit components and the wires connecting them. The IC netlist may include a graphical layout of the circuit and associated files including specifications for each of the circuit components and wires. In a dynamic partitioning scheme, the IC netlist may be partitioned differently depending on the user inputs. Each of the resulting partitions may use inputs and outputs from other circuits and other partitions as well. Once the partitioning is accomplished, an electromagnetic simulation for each partition is performed in a parallel computation scheme, such as encountered in cloud computing environments. Accordingly, a plurality of servers (e.g., master and slave servers) coupled through a network is configured to generate, share where desirable, and apply stimulus vectors to create appropriate current flows and identify electromigration effects in each of the partitions.

FIG. 1 is a block diagram of a cloud computing environment 100 for IC modeling and characterization, according to some embodiments. Cloud computing environment 100 may be a massive parallel architecture of computer servers including a master server 101m and a plurality of slave servers 101s-1 through 101s-N (hereinafter collectively referred to as "slave servers 101s") coupled through a network 150, where N is an integer number. Hereinafter, master server 101m and slave servers 101s in cloud computing environment 100 will be collectively referred to as "servers 101." Network 150 can include, for example, any one or more of a personal area network (PAN), a local area network (LAN), a campus area network (CAN), a metropolitan area network (MAN), a wide area network (WAN), a broadband network (BBN), the Internet, and the like. Further, the network 150 can include, but is not limited to, for example, any one or more of the following network topologies, including a bus network, a star network, a ring network, a mesh network, a star-bus network, tree or hierarchical network, or the like.

Each of servers 101 includes a memory and an operating system. For example, master server 101m includes memory 104m and operating system 115m, and slave servers 101s include memories 104s-1 through 104s-N (hereinafter collectively referred to as "memories 104"). Master server 101m may also include operating system 115m, and slave servers 101s may include slave operating systems 115s-1 through 115s-N (hereinafter, collectively referred to as "operating systems 115"). Master server 101m may also include application 110m, and slave servers 101s may include slave applications 110s-1 through 110s-N (hereinafter, collectively referred to as instances of "application 110"). Slave applications 110s-1 through N include copies of master application software 110m. Master server 101m may keep separate mirror images of slave applications 110s, associated with independent portions of master memory 104*m*. Memories 104, application software 110 and operating systems 115 are configured to store commands to be executed by processors 102*m* and 102*s*-1 through 102*s*-N (hereinafter collectively referred to as "processors 102") to perform at least partially methods as disclosed herein. Servers 101 may be coupled with external disks to save and retrieve data, such as disk 106*m* for master server 101*m*, and disks 106*s* for slave servers 101*s* (hereinafter, collectively referred to as "disks 106").

Master application 110*m* is the main instance of application 110 and may be initially executed by a user having access to master server 101*m* (e.g., through network 150). Master application 110*m* is configured to instantiate and control execution of slave applications 110*s*. For example, in some embodiments master application 110*m* provides suitable initialization routines to place each of slave applications 110*s* in a desired state to start a simulation run, and provides suitable tasks for each of slave applications 110*s*. The tasks may correspond to sequences or computational threads separately performed by each of slave applications 110*s*. Further, master application 110*m* is configured to collect the computation results from each of slave applications 110*s*, when available. Note that, in the architecture of cloud computing environment 100, master server 101*m* has created two instances of slave application 110*s*-1 and 110*s*-2 in slave server 101*s*-2, and up to N instances of slave applications 110*s*-1 through 110*s*-N in slave server 101*s*-N. The multiple instances of slave applications 110*s* in each of slave servers 101*s* may be executed independently of one another. For example, slave servers 101*s*-1 through 101*s*-N may be configured to perform a first computational thread in slave application 110*s*-1, slave servers 101*s*-2 through 102*s*-N may be configured to perform a second computational thread in slave application 110*s*-2, and so on. The results and data for each of the tasks in the first, second, and other computational threads are communicated to and from master server 101*m*, through network 150, to each of the corresponding slave servers 101*s*. Moreover, in some embodiments slave servers 101*s* may communicate with each other through network 150 to share data and results within commonly executed computational threads. For example, slave server 101*s*-1 may communicate with slave server 101*s*-2 data associated with the first computational thread, and so on.

Figure 2:
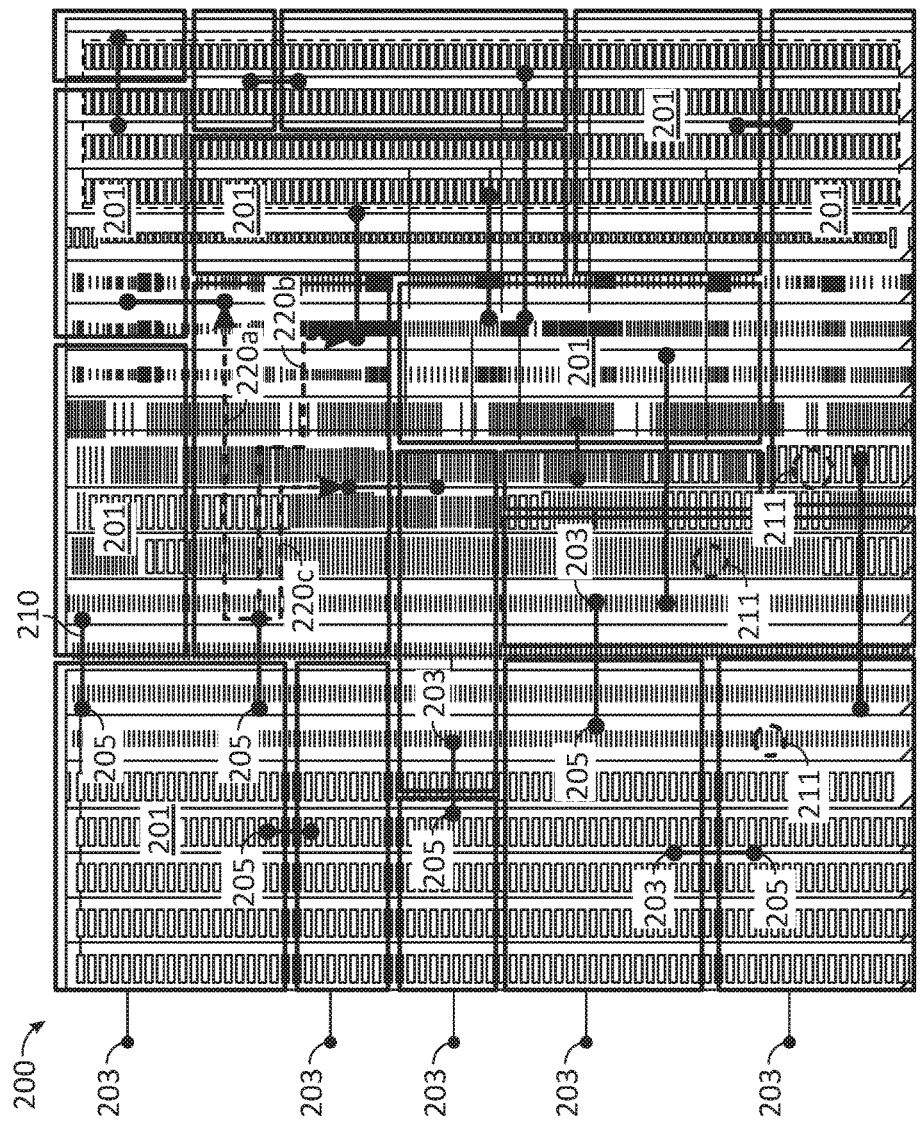
FIG. 2 illustrates partitions of an IC netlist for signal electromigration analysis, according to some embodiments.

FIG. 2 illustrates partitions 201 of an IC netlist 200 for signal electromigration analysis, according to some embodiments. IC netlist 200 represents an IC model including multiple circuit components 211 that may include transistors, resistors, capacitors, inductors, and the wires coupling them. As a non-limiting example, circuit components 211 may include metal-oxide-semiconductor (MOS) transistors such as N-type MOS (NMOS) transistors, P-type MOS (PMOS) transistors, field-effect transistors (FET), fin FET transistors (FinFET), and the like. Each partition 201 includes multiple circuit components 211, at least one input 203 and at least one or more outputs 205. Input 203 may be coupled to an external signal, or to a signal provided by output 205 from another partition 201. In some embodiments, partitions 201 that are non-adjacent may also be coupled through wires 210 in an output/input configuration. In some embodiments, partitioning of IC netlist 200 is performed so that input/output coupling between different partitions 201 through wires 210 occurs across adjacent partitions 201. Accordingly, it is desirable that wires 210 coupling different partitions 201 be shortened to avoid undue time-lag, loss, capacitive effects and other undesirable effects that reduce signal performance. By reducing deleterious effects in signal performance, overall current intensity through wires 210 is desirably kept at lower values, thus reducing the intensity of SEM effects in the IC model.

Each partition 201 further includes at least one signal path 220*a*, 220*b* or 220*c* (hereinafter, collectively referred to as signal paths 220) joining an input 203 to an output 205. Signal paths 220 couple multiple circuit elements sequentially in time and may be logically independent from one another. In some embodiments, signal paths 220 may have a degree of logical coupling, forming a tree wherein a trunk may branch out into multiple signal paths within partition 201. In some embodiments, multiple signal paths may converge into a single path leading into an output 205. Convergence of multiple signal paths 220, or branching out of multiple signal paths 220 are features that may have an impact in SEM of the wires and other elements along signal paths 220. For example, configurations in which all converging signals in a tree include a "high" state ('1') tend to increase the current level in the converging signal path, thereby enhancing SEM effects at least for a period of time. In some embodiments, one of the signal paths (e.g., signal path 220*b*) may be designated as a "critical path," wherein the time it takes a signal to traverse partition 201 from input 203 to output 205 in path 220*b* is the longest for any of signal paths 220. A size of a partition 201 may be associated to the number of circuit elements (e.g., resistors, transistors, capacitors, inductors and the like) in the partition, the number of signal paths in the partition, the number of inputs 203 and outputs 205 in the partition, or the length (in time or in distance) of critical path 220*b*. Each signal path 220 may involve a separate simulation step.

Figure 3:
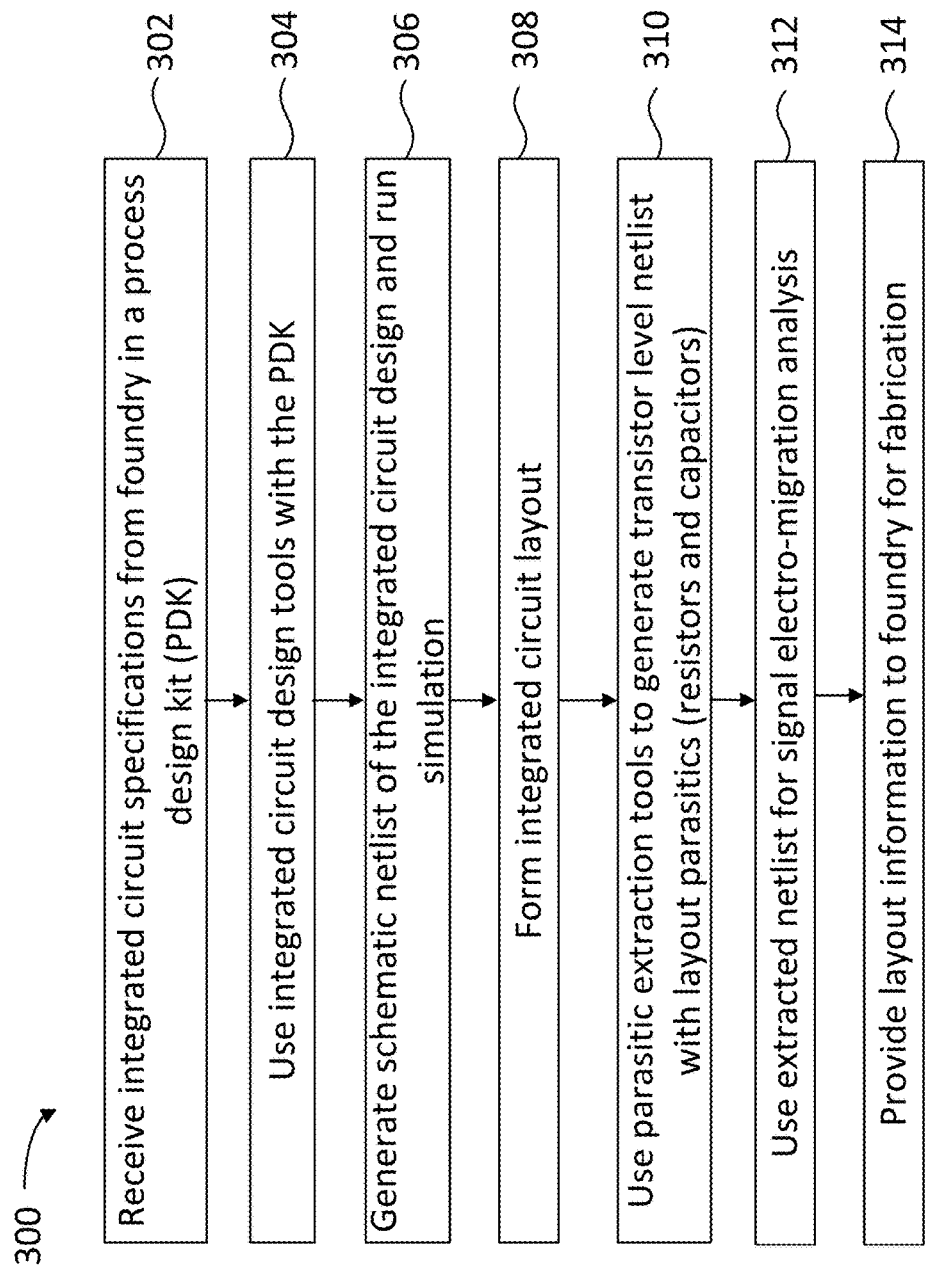
FIG. 3 is a flowchart including steps in a method for IC modeling and characterization according to some embodiments.

FIG. 3 illustrates a flowchart including steps in a method 300 for IC modeling and characterization according to some embodiments. At least some of the steps in method 300 may be performed by a computer having a processor executing commands stored in a memory of the computer. Further, steps as disclosed in method 300 may include retrieving, editing, and/or storing files in a database that is part of, or is communicably coupled to, the computer. Methods consistent with the present disclosure may include at least some, but not all of the steps illustrated in method 300, performed in a different sequence. Furthermore, methods consistent with the present disclosure may include at least two or more steps as in method 300, performed overlapping in time, or almost simultaneously.

In some embodiments, at least one or more of the steps in method 300 may be performed in cloud computing environment 100, wherein the computer may include servers 101, such as a master server 101*m* and a slave servers 101*s*. Accordingly, at least some of the steps illustrated in method 300 may be performed in parallel in different processors 102, following separate computational threads. For example, each of the separate computational threads may be performed by at least one of slave servers 102*s* in each of the applications 110*s* and processors 102*s* dedicated to the specific computational thread.

In some embodiments, master processor 101*m* is configured to provide slave processor 101*s* with an initialization routine to perform at least one of the steps in method 300, and to control an execution of at least one of the steps in method 300 by slave processor 102*s*. Furthermore, a first processor 102 may partially perform at least one of the steps of method 300 in a first computational thread and a second processor 102 may partially perform at least a second one of the steps of method 300 in a second computational thread.

Step 302 includes receiving IC specifications from a foundry. In some embodiments, step 302 may include retrieving a "process development kit" (PDK) file from the foundry, wherein device specifications are listed as functions of independent random variables that a designer may use to develop statistical analysis of the IC performance.

Step 304 includes using IC design tools together with the PDK to generate an IC model. In some embodiments, step 304 includes selecting a characterization tool for the IC modeling task. In some embodiments, step 304 may include selecting a tool from a platform for characterizing multiple IC blocks such as standard cells, memories, mixed signal blocks for timing, variation, signal integrity, power and electro-migration, among other features of IC design.

Step 306 includes generating a schematic netlist of the integrated circuit design and running a simulation of the schematic netlist. In some embodiments, step 306 includes generating an IC model as IC netlist 200.

Step 308 includes forming the integrated circuit layout.

Step 310 includes using parasitic extraction tools to generate a transistor level netlist with layout parasitics. In some embodiments, the layout parasitics may include effects from resistors and capacitors in the netlist simulation.

Step 312 includes using the extracted netlist for a signal electro-migration (SEM) analysis. In some embodiments, step 312 includes transferring the extracted netlist to a parallel architecture for SEM analysis. The parallel architecture may include master server 101m and slave servers 101s coupled through network 150. In some embodiments, step 312 includes separating IC netlist 200 into partitions 201, and separating multiple simulation tasks in computational threads across each of the different partitions 201. For example, a computational thread in cloud environment 100 may be associated with a specific partition 201. This procedure enables efficient and accurate dynamic simulation of partitions 201 (e.g., through simulation tools such as "SPICE" and the like). To separate multiple simulation tasks across each of the different partitions 201, step 312 may include preparing input data files for each of the tasks in the computational threads associated with each of partitions 201. In some embodiments, step 312 also includes combining multiple computational thread results from multiple partitions 201 into a single SEM database for the entire IC netlist 200. The single SEM database may include a single file, or a cluster of files associated with IC netlist 200, wherein a user may determine SEM characteristics of any portion of IC netlist 200. In some embodiments, step 312 may include providing an electromigration report for IC netlist 200 to the foundry. The electromigration report may include the electromigration performance of the plurality of components 211 in IC netlist 200, including expected lifetimes for components 211. The electromigration report may further include statistical analysis of the expected electro-migration lifetimes of different components 211, according to multiple random fabrication variables provided by the foundry in the PDK file.

Step 314 includes providing the layout information to a foundry, to fabricate the integrated circuit. Based on the layout information, the foundry may decide to revise a device specification, such as modified operational conditions (e.g., environmental operation conditions, and the like). In some configurations, the foundry may decide to modify the IC model when certain performance specifications (e.g., SEM lifetime) fall out of an acceptable range.

Figure 4:
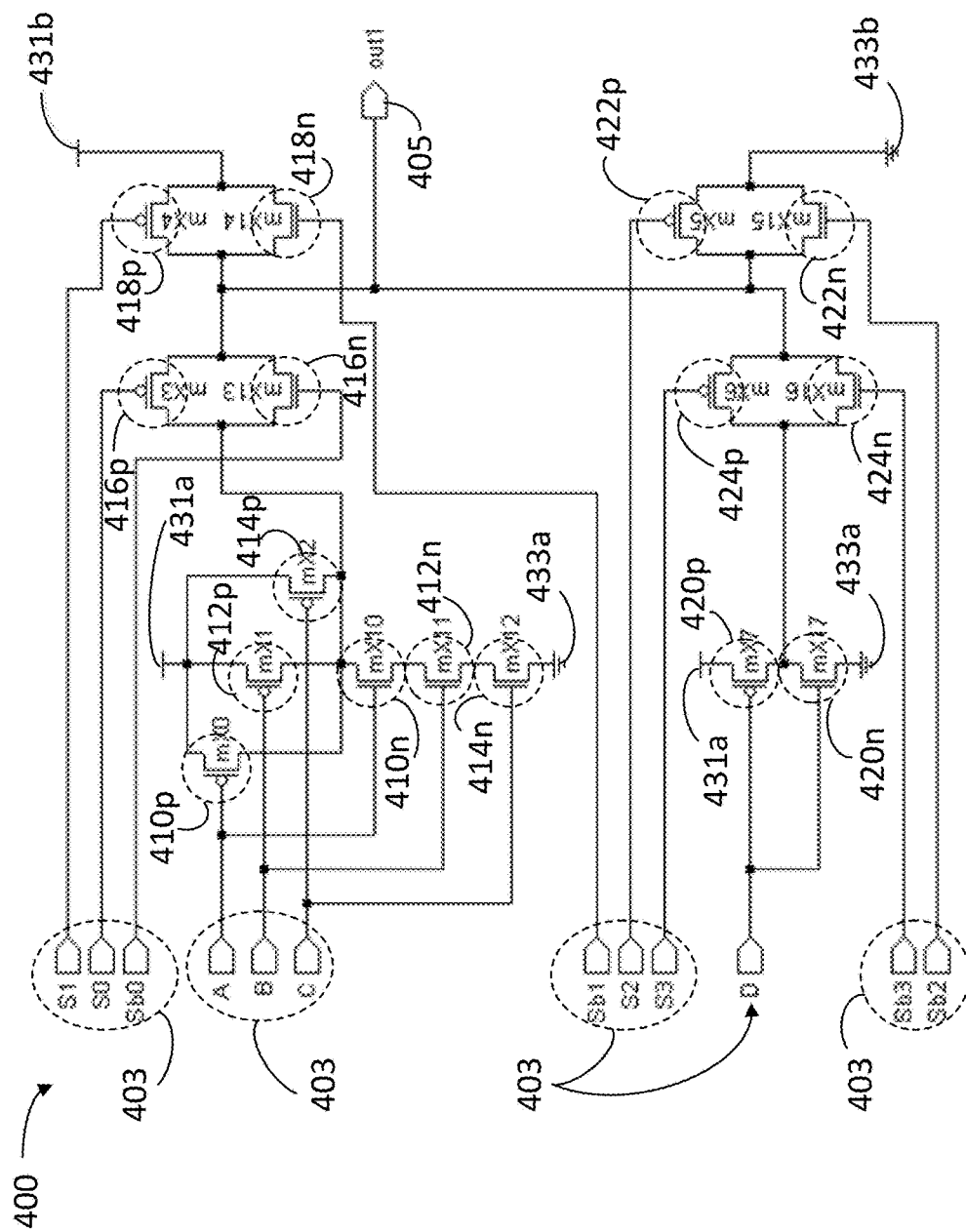
FIG. 4 illustrates a partition netlist for a large channel connector component (CCC) for an IC model, according to some embodiments.

FIG. 4 illustrates a partition netlist 400 for a large channel connector circuit (CCC) for an IC model, according to some embodiments. Netlist 400 includes a plurality of inputs 403 and an output 405. Inputs 403 may be coupled to the gates of multiple transistors in netlist 400. For example, inputs 403 S1, S0 and Sb0 are coupled with the gates of PMOS 418p, PMOS 416p, and NMOS 416n, respectively. Inputs 403 A, B, and C are coupled with the gates of PMOS transistors 410p, 412p, and 414p, respectively, and with the gates of NMOS transistors 410n, 412n, and 414n, respectively. Inputs 403 Sb1, S2 and S3 are coupled with the gate of NMOS 418n, and of PMOS 422p and 424p, respectively. Input 403 D is coupled with the gates of NMOS 420n and PMOS 420p. And inputs 403 Sb2 and Sb3 are coupled with the gates of NMOS 422n and 424n, respectively.

Source and drain terminals in the MOS transistors of partition netlist 400 are coupled with high power voltage supplies 431a and 431b (VDD), and low power voltage supplies 433a and 433b (VSS, or ground).

Figure 5A:
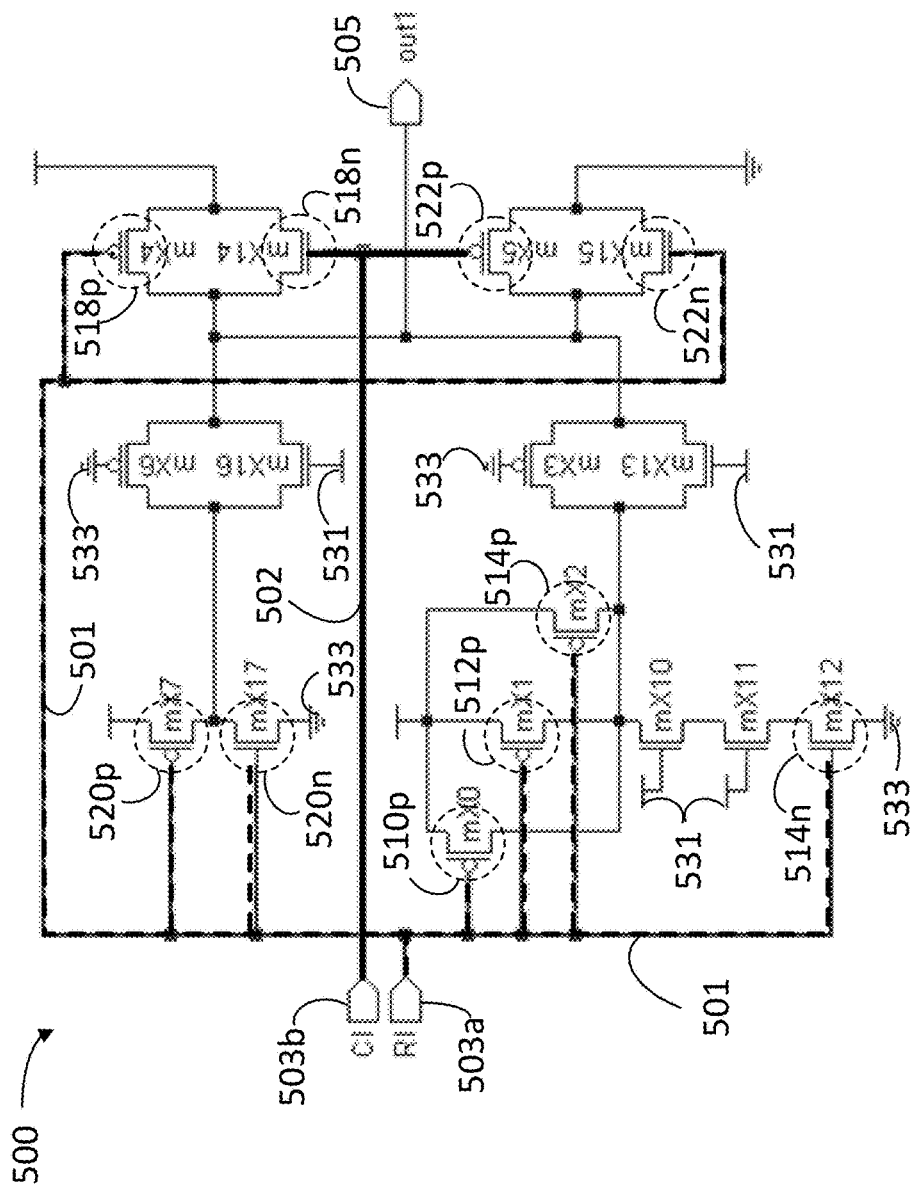
FIG. 5A illustrates the partition netlist of the large CCC of FIG. 4 wired in a pseudo-inverter configuration, according to some embodiments.

FIG. 5A illustrates partition netlist 400 wired in a pseudo-inverter configuration 500, according to some embodiments. Accordingly, configuration 500 includes a reference netlist 501 and a complementary netlist 502. Reference netlists 501 includes a reference input RI 503a, and complementary netlist 502 includes a complementary input CI 503b (hereinafter collectively referred to as inputs 503). Reference netlist 501 provides a logic path from RI 503a to output 505. Complementary netlist 502 provides a logic path from Ci 503b to output 505. Reference netlist 501 couples RI 503a with the gates of PMOS transistors 520p, 522p, 510p, 512p, and 514p, and with the gates of NMOS transistors 520n 514n, and 518n. Complementary netlist 502 couples CI 503b with the gates of PMOS transistor 518p and NMOS transistor 522n. Accordingly, reference netlist 501 and complementary netlist 502 are independent of each other. In some embodiments, only the RI is used, while in other embodiments both the RI and the CI are used.

In some embodiments, pseudo-inverter configuration 500 obtains a toggle in output 505 when inputs 503 are activated alternatively. For example, in some embodiments pseudo-inverter configuration 500 applies a rising transition on RI and a falling transition on CI, or a falling transition on RI and a rising transition on CI. Pseudo-inverter configuration 500 maximizes a current intensity through at least one of circuit components 211 in partition netlist 400. In some embodiments, pseudo-inverter configuration 500 is obtained by modifying partition netlist 400 to form at least two uncorrelated data paths that are the logic opposite of each other from inputs 503 to output 505. In some embodiments, pseudo-inverter configuration 500 includes suitably added voltage sources VDD and ground connections VSS to at least one or more circuit components 211 in partition netlist 400 to achieve a logical pseudo-inverter operation.

Modifying partition netlist 400 couples reference netlist 501 and complementary netlist 502 in a pseudo-inverting configuration 500 wherein second input 503b is configured to invert a logic state induced at output 505 by first input 503a. Thus, an electromagnetic simulation of modified partition netlist 400 into pseudo-inverter configuration 500 determines more accurately an electromigration effect in partition netlist 400. In some embodiments, pseudo-inverter configuration 500 includes all circuit components 211 in partition netlist 400. In some embodiments, pseudo-inverter configuration 500 includes at least some of the transistors, resistors, and capacitors in partition netlist 400.

Figure 5B:
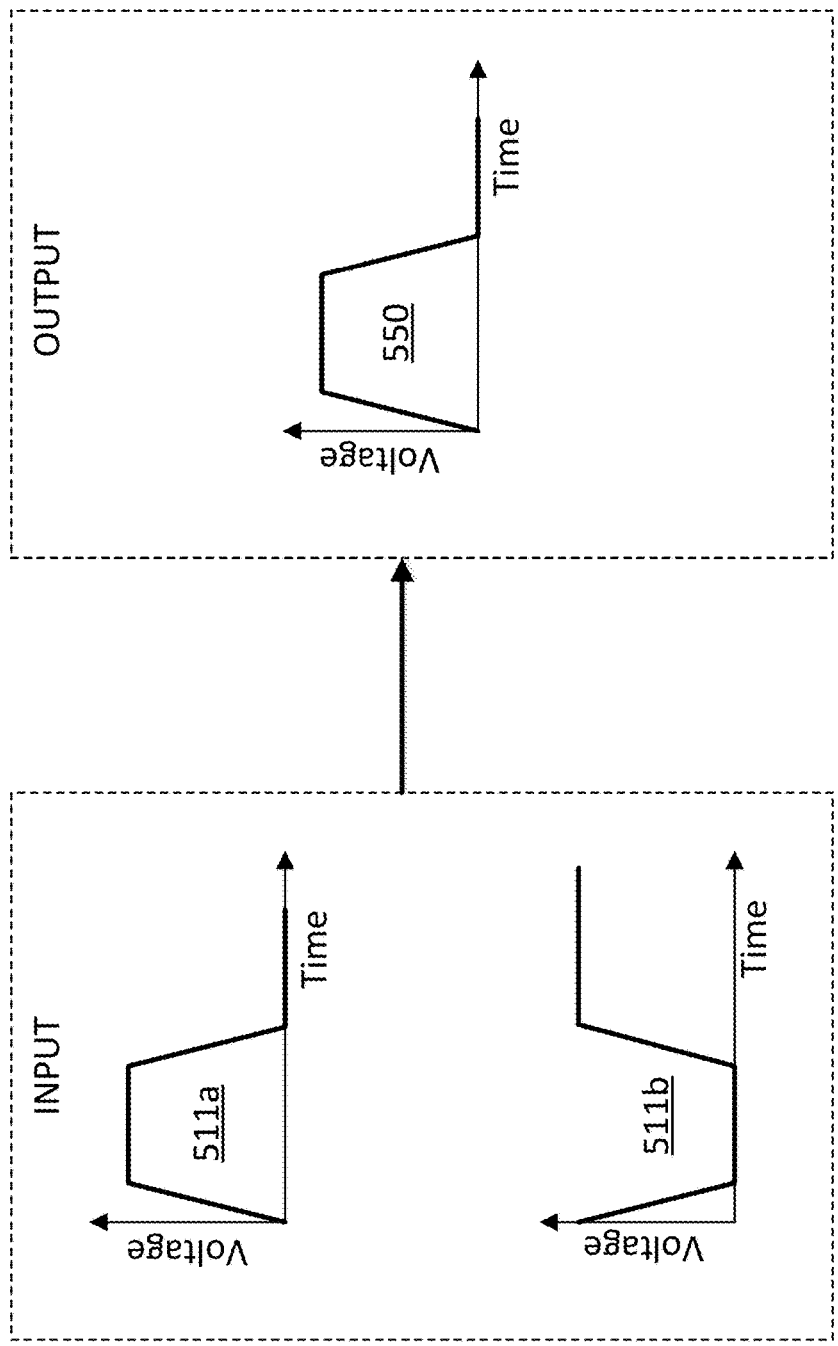
FIG. 5B illustrates waveforms for input and output signals in the pseudo-inverter configuration for the partition netlist of FIG. 5A, according to some embodiments.

FIG. 5B illustrates input waveform 511a and 511b (hereinafter collectively referred to as complementary input waveforms 511) and an output waveform 550 in pseudo-inverter configuration 500 for partition netlist 400, according to some embodiments. Input waveforms 511 illustrate that logic paths 501 and 502 have a pseudo-inverting effect on output 505. Accordingly, a high-to-low transition for input 511a produces the direct effect (high-to-low transition)

in output 550. The opposite effect occurs for input 511*b*. Accordingly, a low-to-high transition in 511*b* produces the opposite effect (high-to-low transition) in 550. The result of pseudo inverter configuration 500 is to test high current flows through all, or most of the circuit components in the partition with a reduced computational burden of applying a stimulus vector including the two pulses illustrated in complementary input waveforms 511.

In some embodiments, CCC netlist 400 may include inputs 403 having specific logical constraints, such as a one-hot constraint or a pair of complimentary inputs. A one-hot constraint may include multiple inputs wherein only one input is allowed to have a high value ("1," or "hot") while the other inputs are set to low ("0"). A complimentary input may include a one-hot constraint for two inputs (e.g., two inputs logically tied to only two possible configurations: 1/0, or 0/1). To generate a pseudo-inverter configuration for such CCC netlists, the multiple inputs may be tied to a power source (hot) or to a ground source (low) values, or to the RI (hot) and the CI (low) to satisfy the logical constraints. Inputs in CCC netlist 400 other than a one-hot or complimentary may be handled as described in detail in FIGS. 5A-B.

In some embodiments, only one or a small number of possible settings for the constrained inputs may be exercised (e.g., 1/0 or 0/1 for complimentary inputs). For example, in some embodiments only a first input (e.g., input A) may be tied to a power source and the second input (e.g., input B) may be tied to a ground source. In some embodiments all possible settings can be exercised, for example in a first setting input A is tied to a power source and input B is tied to a ground source, and in a second setting input A is tied to a ground source and input B is tied to a power source.

In sample embodiments as disclosed herein a cloud computing environment (e.g., cloud computing environment 100) may be configured to implement the multiple input settings as described above. For example, each of the input settings can be applied sequentially in a single computational thread. Accordingly, a first task may determine an EM effect when input A is tied to a power source and input B tied to a ground source, and a second task may determine the EM effect when input A is tied to a ground source and input B is tied to a power source. In some embodiments, the second task may be performed within a first computational thread after completion of the first task. In some embodiments, the first task may be performed in a first computational thread, in parallel with the second task, which is performed in a second thread. More generally, multiple input settings and constraints may be run in parallel over two or more different computational threads in a cloud computing environment.

Figure 6:
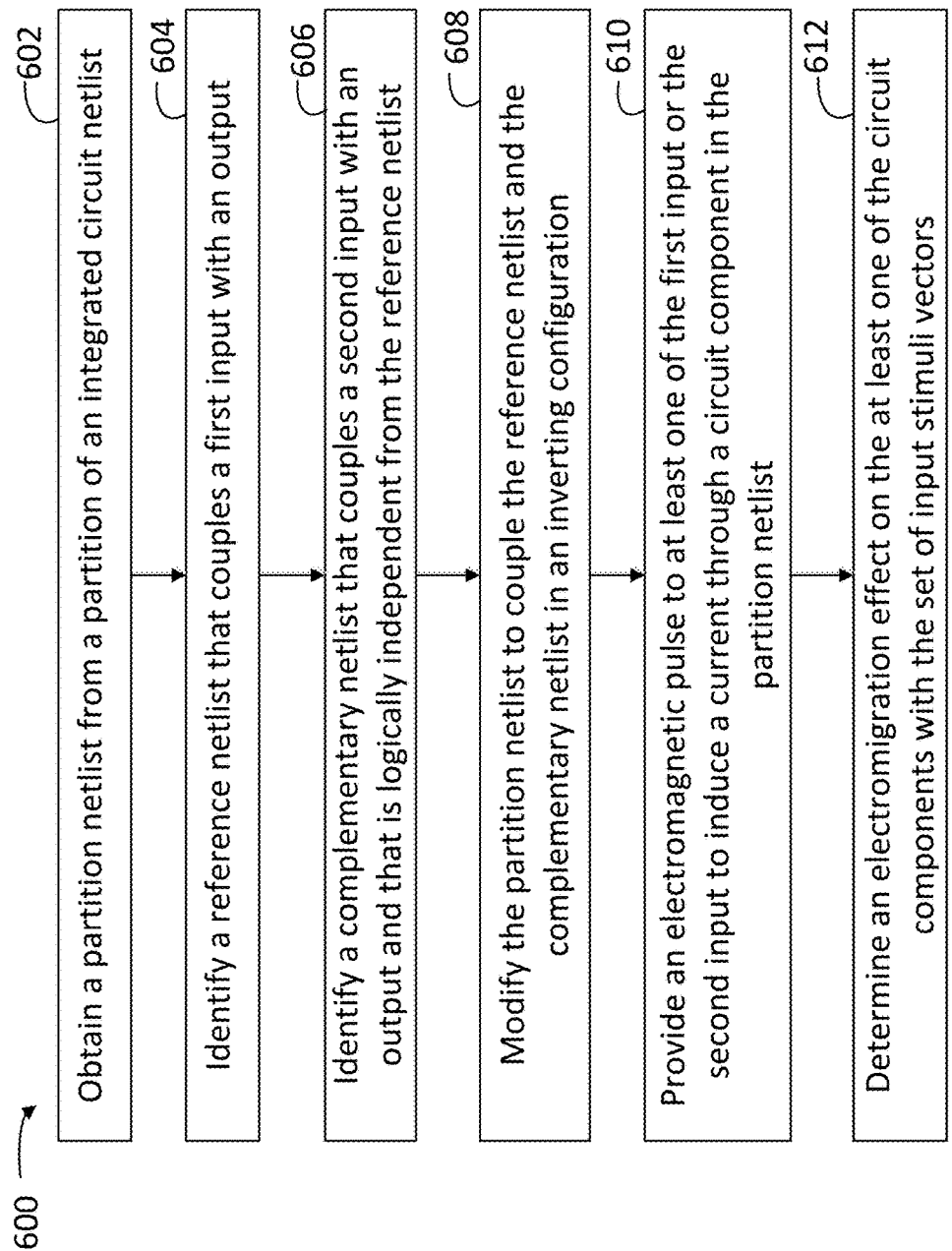
FIG. 6 illustrates a flowchart including steps in a method for determining a signal electromigration effect in an integrated circuit, according to some embodiments.

FIG. 6 illustrates a flowchart including steps in a method 600 for determining a signal electromigration effect in an integrated circuit, according to some embodiments. At least some of the steps in method 600 may be performed by a computer having a processor executing commands stored in a memory of the computer. Further, steps as disclosed in method 600 may include retrieving, editing, and/or storing files in a database that is part of, or is communicably coupled to, the computer. Methods consistent with the present disclosure may include at least some, but not all of the steps illustrated in method 600, performed in a different sequence. Furthermore, methods consistent with the present disclosure may include at least two or more steps as in method 600 performed overlapping in time, or almost simultaneously.

In some embodiments, at least one or more of the steps in method 600 may be performed in cloud computing environment 100, wherein the computer may include servers 101, such as a master server 101*m* and a slave servers 101*s*. Accordingly, at least some of the steps illustrated in method 600 may be performed in parallel in different processors 102, following separate computational threads. For example, each of the separate computational threads may be performed by at least one of slave servers 101*s* in each of the applications 110*s* and processors 102*s* dedicated to the specific computational thread.

In some embodiments, master processor 102*m* is configured to provide slave processor 102*s* with an initialization routine to perform at least one of the steps in method 600, and to control an execution of the at least one of the steps in method 600 by slave processor 102*s*. Furthermore, a first processor 102 may partially perform at least one of the steps of method 600 in a first computational thread and a second processor 102 may partially perform at least a second one of the steps of method 600 in a second computational thread.

In some embodiments, at least one processor 102 may include master processor 102*m* and slave processor 102*s* coupled through network 150. Master processor 102*m* may be configured to provide slave processor 102*s* with an initialization routine to execute at least one portion of the instructions, and to control an execution of the at least one portion of the instructions by slave processor 102*s*. A processor 102 may include a first processor (master or slave) partially executing at least one portion of the instructions in a first computational thread and a second processor 102 (master or slave) partially performing at least a second portion of the instructions in a second computational thread. A processor 102 may include a first processor 102 (master or slave) configured to identify a reference netlist 501 in a first computational thread, and a second processor 102 (master or slave) configured to identify complementary netlist 502 in a second computational thread. Processor 102 may include master processor 102*m* configured to provide partition netlist 400 from a partition 201 of IC netlist 200 to at least one slave processor 102*s*, and the at least one slave processor 102*s* executes the instructions to perform at least some of the steps in method 600.

Step 602 includes obtaining partition netlist 400 from a partition 201 of IC netlist 200. Partition netlist 400 may include a plurality of circuit components 211.

Step 604 includes identifying reference netlist 501 that couples first input 503*a* with output 505.

Step 606 includes identifying complementary netlist 502 that couples second input 503*b* with an output and that is logically independent from reference netlist 501.

In some embodiments, step 606 includes selecting a plurality of circuit components 211 in partition netlist 400 that are decoupled from reference netlist 501.

Step 608 includes modifying partition netlist 400 to couple reference netlist 501 and complementary netlist 502 into inverting configuration 500. In some embodiments, step 608 includes coupling a first terminal in a circuit component 211 with reference netlist 502 and coupling a second terminal in a second circuit component 211 with complementary netlist 502 so that a transition from a high-to-low state occurs in the output; occurs when a transition from a low-to-high state occurs in the first input (RI waveform 511*b*) or when a transition from a high-to-low state occurs in the second input (CI waveform 511*a*) (cf., input waveforms 511 and output waveform 550). For example, step 608 may include coupling a transistor gate with reference netlist 501 when the transistor gate controls a positively doped channel substrate associated to a first power source (e.g., VDD 431*a*) in partition netlist 400 (e.g., PMOS transistors 510*p*, 512*p*, 514*p*, 518*p*, 520*p*) and with the complementary netlist 502 when the transistor gate controls a negatively doped channel substrate (e.g., NMOS transistor 518*n*) associated to a second power source (e.g., VDD 431*b*) in partition netlist 400. In some embodiments, step 608 includes coupling a transistor gate with reference netlist 501 when the transistor gate controls a negatively doped channel substrate (e.g., NMOS transistors 514*n*, 520*n*, and 522*n*) associated with a ground source (e.g., VSS 433*a* and VSS 433*b*) in partition netlist 400, and with complementary netlist 502 when the transistor gate controls a positively doped channel substrate (e.g., PMOS 522*p*) associated with a ground source (e.g., VSS 433*b*). In some embodiments, step 608 includes coupling a transistor gate with a power source (e.g., VDD 531) when the transistor gate controls a negatively doped channel substrate, and with a ground source (e.g., VSS 533) when the transistor gate controls a positively doped channel substrate.

In some embodiments, when the partition netlist includes logically constrained inputs (e.g., a one-hot constraint or a pair of complementary inputs), step 608 may include tying at least a hot input to a power source and a low input to a ground source. Furthermore, in some embodiments step 608 may include configuring the constrained inputs in multiple settings and assigning each of the settings to at least one computational thread in a cloud computing environment.

Step 610 includes providing an electromagnetic pulse to at least one of the first or second inputs 503 to induce a current through one of circuit components 211. In some embodiments, step 610 includes providing a low-to-high state transition (cf., waveform 511*a*) to first input 503*a* and a high-to-low state transition (cf., waveform 511*b*) in the second input 503*b*. In some embodiments, step 610 includes providing an input stimulus vector having a first electromagnetic pulse for first input 503*a* and a second electromagnetic pulse for second input 503*b*, wherein the second electromagnetic pulse is inverted relative to the first electromagnetic pulse.

Step 612 includes determining an electromigration effect on the at least one of circuit components 211 with the set of input stimuli vectors.

Figure 7:
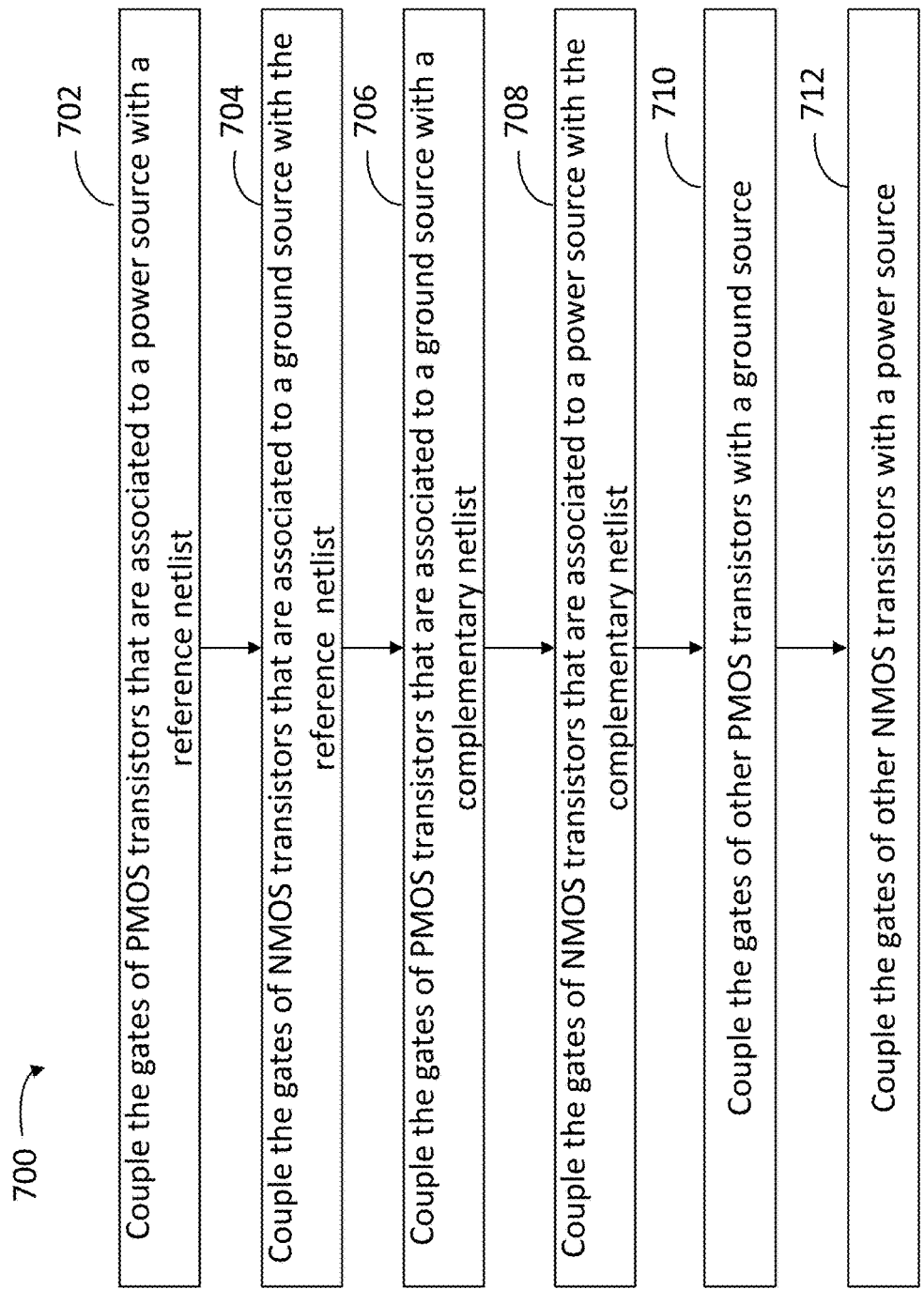
FIG. 7 illustrates a flowchart including steps in a method for modifying a large CCC netlist into a pseudo inverter configuration, according to some embodiments.

FIG. 7 illustrates a flowchart including steps in a method 700 for modifying a large CCC netlist into a pseudo inverter configuration, according to some embodiments. At least some of the steps in method 700 may be performed by a computer having a processor executing commands stored in a memory of the computer. Further, steps as disclosed in method 700 may include retrieving, editing, and/or storing files in a database that is part of, or is communicably coupled to, the computer. Methods consistent with the present disclosure may include at least some, but not all of the steps illustrated in method 700, performed in a different sequence. Furthermore, methods consistent with the present disclosure may include at least two or more steps as in method 700 performed overlapping in time, or almost simultaneously.

In some embodiments, at least one or more of the steps in method 700 may be performed in cloud computing environment 100, wherein the computer may include servers 101, such as a master server 101*m* and a slave servers 101*s*. Accordingly, at least some of the steps illustrated in method 700 may be performed in parallel in different processors 102, following separate computational threads. For example, each of the separate computational threads may be performed by at least one of slave servers 101*s* in each of the applications 110*s* and processors 102*s* dedicated to the specific computational thread.

In some embodiments, master processor 102*m* is configured to provide slave processor 102*s* with an initialization routine to perform at least one of the steps in method 700, and to control an execution of the at least one of the steps in method 700 by slave processor 102*s*. Furthermore, a first processor 102 may partially perform at least one of the steps of method 700 in a first computational thread and a second processor 102 may partially perform at least a second one of the steps of method 700 in a second computational thread.

Step 702 includes coupling the gates of PMOS transistors that are associated to a power source (e.g., VDD 431*a* and VDD 431*b*, and transistors 410*p*, 412*p*, and 414*p*, 418*p* and 420*p*) with reference input netlist 501.

Step 704 includes coupling the gates of NMOS transistors that are associated to a ground source (e.g., VSS 433*a* and VSS 433*b*, and transistors 414*n*, 420*n*, and 422*n*) with reference input netlist 501.

Step 706 includes coupling the gates of PMOS transistors that are associated to a ground source (e.g., VSS 433*b* and transistor 422*p*) with complementary input netlist 502.

Step 708 includes coupling the gates of NMOS transistors that are associated to a power source (e.g., VDD 431*b* and transistor 418*n*) with complementary input netlist 502.

Step 710 includes coupling the gates of other PMOS transistors with a ground source (e.g., ground source 533 and transistor 416*p*). In some embodiments, the ground source is a VSS source and is always on.

Step 712 includes coupling the gates of other NMOS transistors with a power source (e.g., power source 531 and transistor 416*n*). In some embodiments, the power source is a VDD source and is always on.

Figure 8:
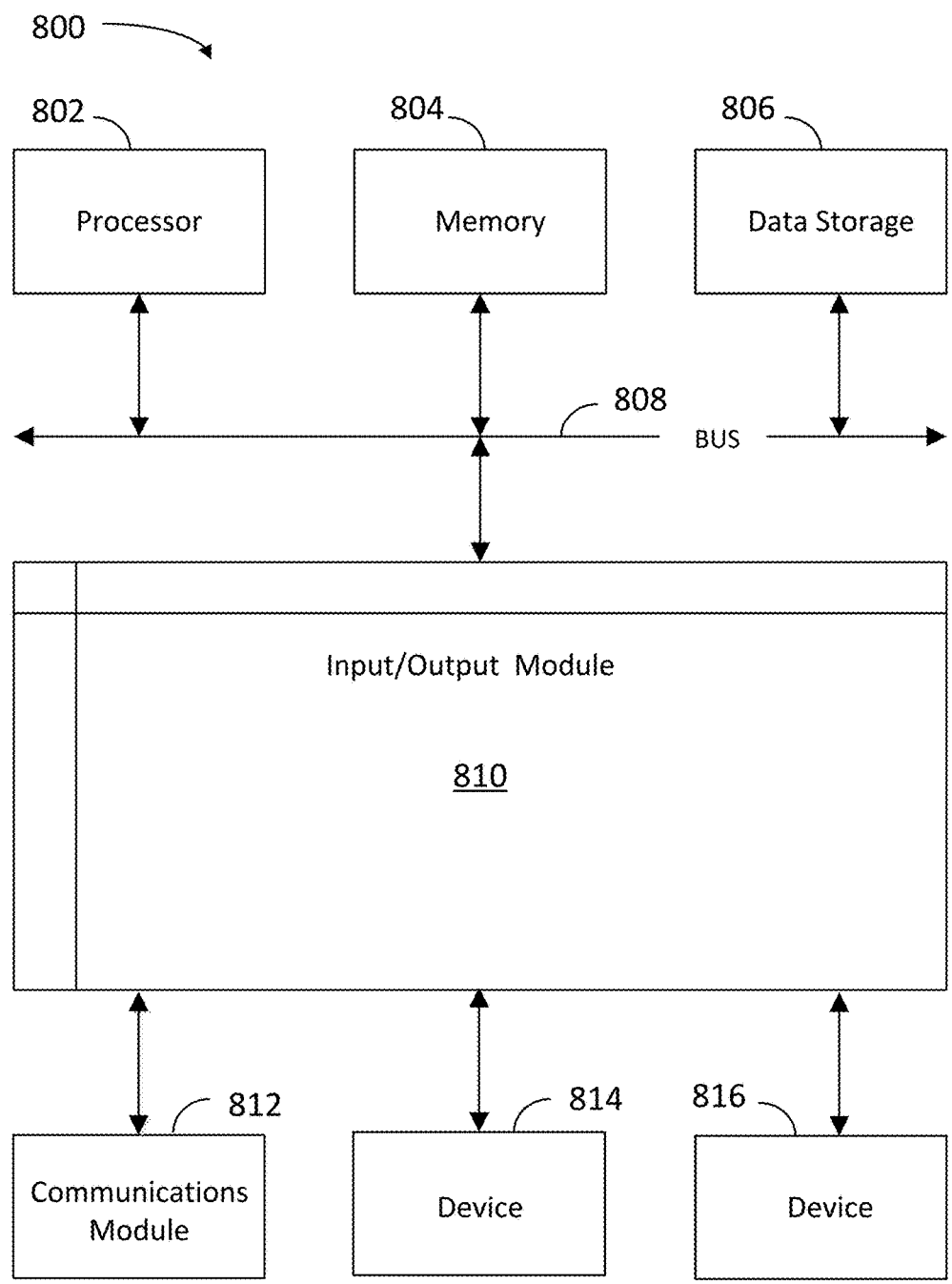
FIG. 8 is a block diagram illustrating an example computer system that includes a design tool, according to some embodiments.

FIG. 8 is a block diagram illustrating an example computer system 800 with which the methods, steps and systems illustrated in FIGS. 1-7 can be implemented, according to some embodiments. In certain aspects, computer system 800 can be implemented using hardware or a combination of software and hardware, either in a dedicated server, integrated into another entity, or distributed across multiple entities.

Computer system 800 includes a bus 808 or other communication mechanism for communicating information, and a processor 802 coupled with bus 808 for processing information. By way of example, computer system 800 can be implemented with one or more processors 802. Processor 802 can be a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information. In some embodiments, processor 802 may include modules and circuits configured as a 'placing' tool or engine, or a 'routing' tool or engine, to place devices and route channels in a circuit layout, respectively and as disclosed herein.

Computer system 800 includes, in addition to hardware, code that creates an execution environment for the computer program in question, e.g., code that constitutes processor firmware, a protocol stack, a database management system, an operating system, or a combination of one or more of them stored in an included memory 804, such as a Random Access Memory (RAM), a flash memory, a Read Only Memory (ROM), a Programmable Read-Only Memory (PROM), an Erasable PROM (EPROM), registers, a hard disk, a removable disk, a CD-ROM, a DVD, or any other suitable storage device, coupled to bus 808 for storing information and instructions to be executed by processor 802. Processor 802 and memory 804 can be supplemented by, or incorporated in, special purpose logic circuitry.

The instructions may be stored in memory 804 and implemented in one or more computer program products, i.e., one or more modules of computer program instructions encoded on a computer readable medium for execution by, or to control the operation of, the computer system 800, and according to any method well known to those of skill in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, Wirth languages, embeddable languages, and xml-based languages. Memory 804 may also be used for storing temporary variable or other intermediate information during execution of instructions to be executed by processor 802.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network. The processes and logic flows described in this specification can be performed by one or more programmable processors executing one or more computer programs to perform functions by operating on input data and generating output.

Computer system 800 further includes a data storage device 806 such as a magnetic disk or optical disk, coupled to bus 808 for storing information and instructions.

Computer system 800 is coupled via input/output module 810 to various devices. The input/output module 810 is any input/output module. Example input/output modules 810 include data ports such as USB ports. The input/output module 810 is configured to connect to a communications module 812. Example communications modules 812 include networking interface cards, such as Ethernet cards and modems. In certain aspects, the input/output module 810 is configured to connect to a plurality of devices, such as an input device 814 and/or an output device 816. Example input devices 814 include a keyboard and a pointing device, e.g., a mouse or a trackball, by which a user can provide input to the computer system 800. Other kinds of input devices 814 are used to provide for interaction with a user as well, such as a tactile input device, visual input device, audio input device, or brain-computer interface device. For example, feedback provided to the user can be any form of sensory feedback, e.g., visual feedback, auditory feedback, or tactile feedback; and input from the user can be received in any form, including acoustic, speech, tactile, or brain wave input. Example output devices 816 include display devices, such as a LED (light emitting diode), CRT (cathode ray tube), or LCD (liquid crystal display) screen, for displaying information to the user.

Methods as disclosed herein may be performed by computer system 800 in response to processor 802 executing one or more sequences of one or more instructions contained in memory 804. Such instructions may be read into memory 804 from another machine-readable medium, such as data storage device 806. Execution of the sequence of instructions contained in main memory 804 causes processor 802 to perform the process steps described herein (e.g., as in methods 300, 600 and 700). One or more processors in a multi-processing arrangement may also be employed to execute the sequence of instructions contained in memory 804. In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., communication network 150. For example, some aspects of the subject matter described in this specification may be performed on a cloud-computing environment. Accordingly, in certain aspects a user of systems and methods as disclosed herein may perform at least some of the steps by accessing a cloud server through a network connection. Further, data files, circuit diagrams, performance specifications and the like resulting from the disclosure may be stored in a database server in the cloud-computing environment, or may be downloaded to a private storage device from the cloud-computing environment.

Computing system 800 includes servers and personal computer devices. A personal computing device and server are generally remote from each other and typically interact through a communication network. The relationship of client and server arises by virtue of computer programs running on the respective computers and having a client-server relationship to each other. Computer system 800 can be, for example, and without limitation, a desktop computer, laptop computer, or tablet computer. Computer system 800 can also be embedded in another device, for example, and without limitation, a mobile telephone, a personal digital assistant (PDA), a mobile audio player, a Global Positioning System (GPS) receiver, a video game console, and/or a television set top box.

The term "machine-readable storage medium" or "computer readable medium" as used herein refers to any medium or media that participates in providing instructions or data to processor 802 for execution. Such a medium may take many forms, including, but not limited to, non-volatile media, volatile media, and transmission media. Non-volatile media include, for example, optical disks, magnetic disks, or flash memory, such as data storage device 806. Volatile media include dynamic memory, such as memory 804. Transmission media include coaxial cables, copper wire, and fiber optics, including the wires that comprise bus 808. Common forms of machine-readable media include, for example, floppy disks, flexible disks, hard disks, magnetic tapes, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter affecting a machine-readable propagated signal, or a combination of one or more of them.

In one aspect, a method may be an operation, an instruction, or a function and vice versa. In one aspect, a clause or a claim may be amended to include some or all of the words (e.g., instructions, operations, functions, or components) recited in one or more clauses, one or more words, one or more sentences, one or more phrases, one or more paragraphs, and/or one or more claims.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

A reference to an element in the singular is not intended to mean "one and only one" unless specifically stated, but rather "one or more." The term "some," refers to one or more. Underlined and/or italicized headings and subheadings are used for convenience only, do not limit the subject technology, and are not referred to in connection with the interpretation of the description of the subject technology. Relational terms such as first and second and the like may be used to distinguish one entity or action from another without necessarily requiring or implying any actual such relationship or order between such entities or actions. All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description. No claim element is to be construed under the provisions of 35 U.S.C. § 112, sixth paragraph, unless the element is expressly recited using the phrase "means for" or, in the case of a method claim, the element is recited using the phrase "step for."

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

The subject matter of this specification has been described in terms of particular aspects, but other aspects can be implemented and are within the scope of the following claims. For example, while operations are depicted in the drawings in a particular order, this should not be understood as requiring that such operations be performed in the particular order shown or in sequential order, or that all illustrated operations be performed, to achieve desirable results. The actions recited in the claims can be performed in a different order and still achieve desirable results. As one example, the processes depicted in the accompanying figures do not necessarily require the particular order shown, or sequential order, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products.

The title, background, brief description of the drawings, abstract, and drawings are hereby incorporated into the disclosure and are provided as illustrative examples of the disclosure, not as restrictive descriptions. It is submitted with the understanding that they will not be used to limit the scope or meaning of the claims. In addition, in the detailed description, it can be seen that the description provides illustrative examples and the various features are grouped together in various implementations for the purpose of streamlining the disclosure. The method of disclosure is not to be interpreted as reflecting an intention that the claimed subject matter requires more features than are expressly recited in each claim. Rather, as the claims reflect, inventive subject matter lies in less than all features of a single disclosed configuration or operation. The claims are hereby incorporated into the detailed description, with each claim standing on its own as a separately claimed subject matter.

The claims are not intended to be limited to the aspects described herein, but are to be accorded the full scope consistent with the language claims and to encompass all legal equivalents. Notwithstanding, none of the claims are intended to embrace subject matter that fails to satisfy the requirements of the applicable patent law, nor should they be interpreted in such a way.

The invention claimed is:

1. A computer-implemented method for determining a signal electromigration effect in a circuit, comprising:
   obtaining, with a circuit design tool, a partition netlist from a partition of an integrated circuit netlist, the partition netlist comprising an identification of a plurality of circuit components;
   identifying, with a characterization tool, a reference netlist that couples a first input of the partition netlist with an output of the partition netlist;

identifying, with the characterization tool, a complementary netlist that couples a second input of the partition netlist with the output of the partition netlist, wherein the complementary netlist is logically independent from the reference netlist;

modifying the partition netlist to couple the reference netlist and the complementary netlist in an inverting configuration wherein the output of the partition netlist is a same output when the first input is a logical inverse of the second input;

providing an electromagnetic pulse to at least one of the first input or the second input of the partition netlist to induce a current through one of the plurality of circuit components; and determining an electromigration effect from the current on the one of the plurality of circuit components.

2. The computer-implemented method of claim 1, wherein identifying a complementary netlist comprises selecting a plurality of circuit components in the partition netlist that are decoupled from the reference netlist.

3. The computer-implemented method of claim 1, wherein modifying the partition netlist to couple the reference netlist and the complementary netlist in an inverting configuration comprises selecting the second input of the partition netlist to invert a logic state induced at the output of the partition netlist by the first input of the partition netlist.

4. The computer-implemented method of claim 1, wherein modifying the partition netlist comprises coupling a first terminal in a first one of the plurality of circuit components with the reference netlist and coupling a second terminal in a second one of the plurality of circuit components with the complementary netlist so that a transition from a low-to-high state occurs in the output of the partition netlist occurs when a transition from a low-to-high state occurs in the first input of the partition netlist or when a transition from a high-to-low state occurs in the second input of the partition netlist.

5. The computer-implemented method of claim 1, wherein modifying the partition netlist comprises coupling a transistor gate with the reference netlist when the transistor gate controls a positively doped channel substrate associated with a first power source in the partition netlist, and with the complementary netlist when the transistor gate controls a negatively doped channel substrate associated with a second power source in the partition netlist.

6. The computer-implemented method of claim 1, wherein modifying the partition netlist comprises coupling a transistor gate with the reference netlist when the transistor gate controls a negatively doped channel substrate associated with a first ground source in the partition netlist, and with the complementary netlist when the transistor gate controls a positively doped channel substrate associated with a second ground source in the partition netlist.

7. The computer-implemented method of claim 1, wherein modifying the partition netlist comprises coupling a transistor gate with a power source when the transistor gate controls a negatively doped channel substrate, and with a ground source when the transistor gate controls a positively doped channel substrate.

8. The computer-implemented method of claim 1, wherein modifying the partition netlist comprises coupling a power source to some constrained inputs and coupling a ground to other constrained inputs to satisfy a constraint in a constrained input setting for a computational thread in a cloud computing environment.

9. The computer-implemented method of claim 1, wherein:

providing an electromagnetic pulse to at least one of the first input or the second input of the partition netlist comprises providing an input stimulus vector having a first electromagnetic pulse for the first input and a second electromagnetic pulse to the second input of the partition netlist, and the second electromagnetic pulse is inverted relative to the first electromagnetic pulse.

10. A system, comprising:

a memory, storing instructions; and at least one processor that executes the instructions to:

obtain, with a circuit design tool, a partition netlist from a partition of an integrated circuit netlist, the partition netlist comprising an identification of a plurality of circuit components;

identify, with a characterization tool, a reference netlist that couples a first input of the partition netlist with an output of the partition netlist;

identify, with a characterization tool, a complementary netlist that couples a second input of the partition netlist with the output, wherein the complementary netlist is logically independent from the reference netlist;

modify the partition netlist to couple the reference netlist and the complementary netlist in an inverting configuration wherein the output of the partition netlist is a same output when the first input is a logical inverse of the second input;

provide an electromagnetic pulse to at least one of the first input or the second input of the partition netlist to induce a current through one of the plurality of circuit components; and determine an electromigration effect from the current on the one of the plurality of circuit components.

11. The system of claim 10, wherein the at least one processor comprises a master processor and a slave processor coupled through a network connection, wherein the master processor is configured to provide the slave processor with an initialization routine to execute at least one portion of the instructions, and to control an execution of the at least one portion of the instructions by the slave processor.

12. The system of claim 10, wherein the at least one processor comprises a first processor partially executing at least one portion of the instructions in a first computational thread and a second processor partially performing at least a second portion of the instructions in a second computational thread.

13. The system of claim 10, wherein the at least one processor comprises a first processor configured to identify the reference netlist in a first computational thread, and a second processor configured to identify the complementary netlist in a second computational thread.

14. The system of claim 10, wherein the at least one processor comprises a master processor and a slave processor coupled through a network connection, wherein the master processor is configured to provide the partition netlist from a partition of an integrated circuit netlist to the slave processor, and the slave processor executes the instructions.

15. The system of claim 10, wherein to modify the partition netlist the at least one processor executes instructions to couple a transistor gate that is associated to a power source in the partition netlist with the reference netlist when the transistor gate controls a positively doped channel substrate and with the complementary netlist when the transistor gate controls a negatively doped channel substrate.

16. The system of claim 10, wherein to modify the partition netlist the at least one processor executes instructions to couple a transistor gate that is associated to a ground source in the partition netlist with the reference netlist when the transistor gate controls a negatively doped channel substrate, and with the complementary netlist when the transistor gate controls a positively doped channel substrate.

17. The system of claim 10, wherein to modify the partition netlist the at least one processor executes instructions to couple a transistor gate with a power source when the transistor gate controls a negatively doped channel substrate, and with a ground source when the transistor gate controls a positively doped channel substrate.

18. The system of claim 10, wherein to modify the partition netlist the at least one processor executes instructions to couple a power source to some constrained inputs and to couple a ground source to other constrained inputs to satisfy a constraint in a constrained input setting for a computational thread in a cloud computing environment.

19. A non-transitory, machine-readable medium comprising instructions stored in a memory which, when executed by a processor cause a computer to perform steps in a method, the method comprising:

obtaining, with a circuit design tool, a partition netlist from a partition of an integrated circuit netlist, the partition netlist comprising an identification of a plurality of circuit components;

identifying, with a characterization tool, a reference netlist that couples a first input of the partition netlist with an output of the partition netlist;

identifying, with a characterization tool, a complementary netlist that couples a second input of the partition netlist with the output, wherein the complementary netlist is logically independent from the reference netlist;

modifying the partition netlist to couple the reference netlist and the complementary netlist in an inverting configuration wherein the output of the partition netlist is a same output when the first input is a logical inverse of the second input;

providing an electromagnetic pulse to at least one of the first input or the second input of the partition netlist to induce a current through one of the plurality of circuit components; and determining an electromigration effect from the current on the one of the plurality of circuit components.

20. The non-transitory, machine-readable medium of claim 19, wherein, in the method, modifying the partition netlist to couple the reference netlist and the complementary netlist in an inverting configuration comprises coupling a power source to some constrained inputs and coupling a ground source to other constrained inputs to satisfy a constraint in a constrained input setting for a computational thread in a cloud computing environment.

* * * * *